Dec. 30, 1947.  H. B. JANSEN  2,433,456
VARIABLE TRANSPARENCY CLOSURE
Filed June 19, 1945  2 Sheets-Sheet 1

INVENTOR.
HARRY B. JANSEN
BY George Sullivan
Agent

Dec. 30, 1947.  H. B. JANSEN  2,433,456
VARIABLE TRANSPARENCY CLOSURE
Filed June 19, 1945  2 Sheets-Sheet 2
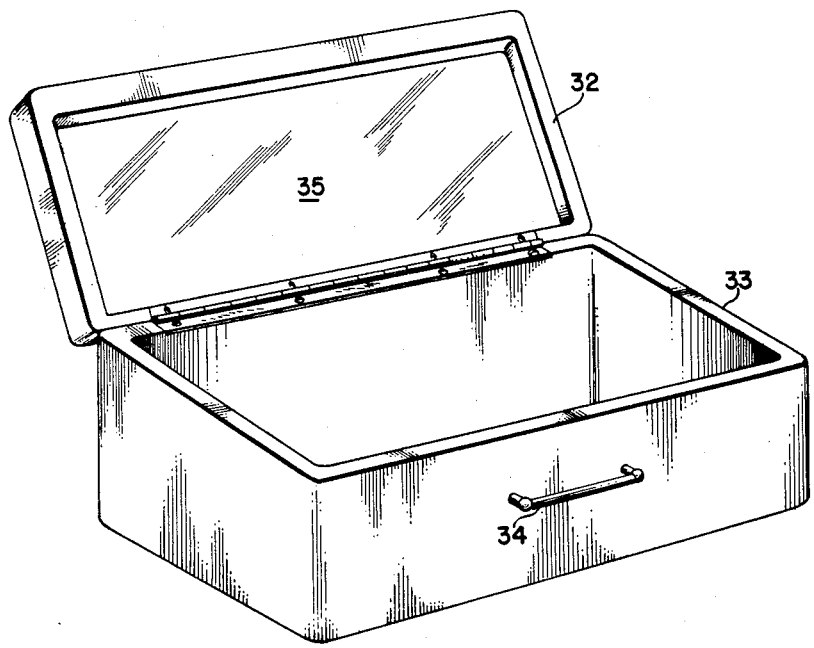
Fig. 5
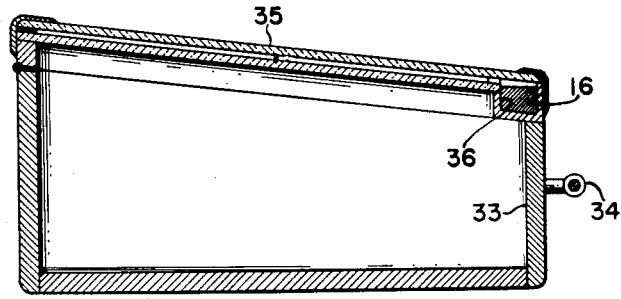
Fig. 6
INVENTOR.
HARRY B. JANSEN
BY 
Agent Patented Dec. 30, 1947 -

2,433,456

UNITED STATES PATENT OFFICE 2,433,456

VARIABLE TRANSPARENCY CLOSURE

Harry B. Jansen, Glendale, Calif., assignor to Lockheed Aircraft Corporation, Burbank, Calif.

Application June 19, 1945, Serial No. 600,371

2 Claims. (Cl. 88—60)

This invention relates to an improved variable transparency for a glazed window or closure, wherein the transparency may be varied by rendering the glazing opaque, reflecting, translucent, or transparent at will, or by introducing a colored medium capable of either reducing the transparency or acting as a color filter to light passing therethrough.

I am aware that it has heretofore been proposed to insert various colored liquids between spaced plates of glass to produce color filters, and to variably position the axes of polarization of two polarized panels to vary the light transmitted therethrough. My invention is directed to a self-contained double glazed structure wherein a pocket or chamber carries the required amount of fluid to fill the space between the two panes when set in one position, and wherein the fluid is adapted to flow out of the chamber into the space between the panes when the assembled glazed structure is rotated, tilted or turned into a position wherein the chamber can be emptied due to the force of gravity. Thus it is an important object of my invention to provide an improved and self-contained unit that can be operated by merely tilting or turning the framework in which such glazing units may be mounted.

My invention contemplates the use of either opaque or transparent fluids. An example of the former is mercury, which when introduced between the spaced panes of a double glazed window or the like converts both surfaces into mirrors. Transparent fluids such as alcohol can be colored as desired to produce various shading, filtering or anti-glare effects, for example tints of green, blue or orange, which may be chosen to be visually transparent or translucent, while mellowing the full effect of direct sunlight.

It is a further object of this invention to provide an improved, self-contained and simplified double glazed panel of the class described that can be incorporated in windows or closures with a minimum of structural alterations in the framework, and which can be incorporated in new construction without materially altering the external appearance thereof.

Other and further objects of this invention will become apparent as the description proceeds.

For a fuller understanding of the nature and objects of my invention reference should be made to the accompanying detailed description taken in connection with the accompanying drawings, wherein:

Figure 5 is a perspective view of a container having a hinged lid embodying the features of my invention.

Figure 6 is a transverse section of Figure 5 showing the lid in closed position, wherein the glazing is transparent.

Figure 1:
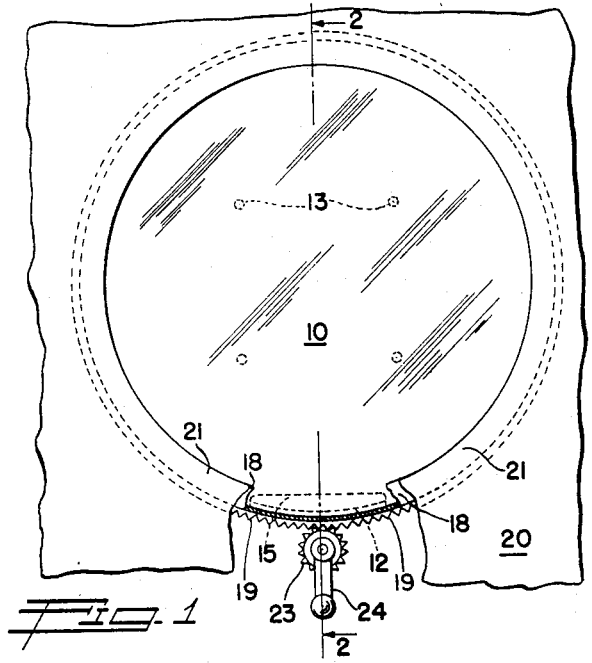
Figure 1 is a front view, partly broken away to show the rotating mechanism, of a rotary window or enclosure forming one embodiment of my invention.

As shown in the drawings, I have chosen to illustrate three embodiments of my invention, namely a non-ventilating type of rotary window, a ventilating type of pivoted window, and a transparent closure. It will be evident that the arrangement of my invention is adaptable to many other purposes for either variable visibility or display purposes.

Figure 2:
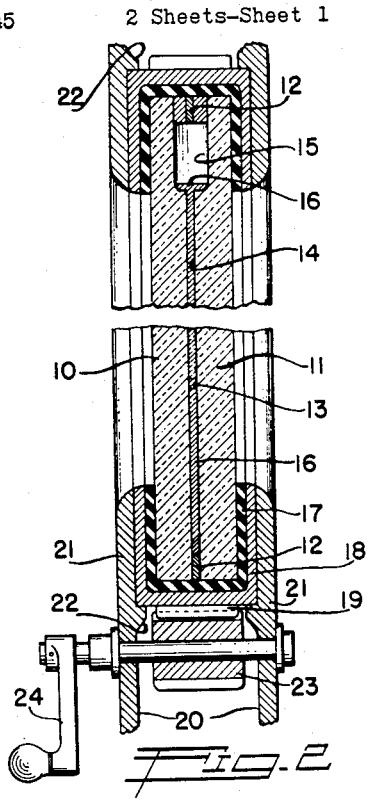
Figure 2 is an enlarged fragmentary detail section on the line 2—2 of Figure 1 showing the window rotated 180°.

In the showing of Figures 1 and 2, I provide two circular spaced panes of transparent material 10 and 11 which are maintained and sealed relative to each other by suitable spacing gaskets 12, preferably cemented or bonded to the panes. If the area of the panes render it desirable, individual spacers 13 may be disposed between the panes at intervals intermediate the edges, in order to prevent undue variation in the central space 14 between the panes. It is possible to bond both the edge gaskets 12 and intermediate spacers 13 to the contacting surfaces of the panes 10 and 11 by known methods now used in the manufacture of laminated glass and plastics, and the interlayers now in use for such laminated glass and/or plastic will serve my purpose as gaskets and spacers, although other materials and methods may be used if desired.

An enlarged pocket or chamber 15 is provided at one point in the circumference of the assembled panes and gaskets, communicating directly with the space between the panes. The volume of the chamber preferably exceeds the volume of the space 14, and the chamber is filled with a suitable fluid 16 to be described hereinafter. I prefer to arrange the chamber 15 as an arcuate segment readily concealed behind the mounting means to be now described, although the chamber may be arranged outside the periphery of the panes 10 and 11 as in other embodiments disclosed herein.

The assembled panel of the panes 10 and 11 and gaskets 12 is conveniently mounted in a rubberlike channel 17, in turn mounted in a channel-like frame 18 having gear teeth 19 on its periphery. The frame 18 is in turn built into a suitable stationary structure 20 having side guides 21 and circular guides 22 whereby the frame 18 is rotatable in the guides 21 and 22. Rotation may be accomplished by a pinion 23 and hand crank 24 suitably supported in the structure 20 with the pinion meshing with the gear teeth 19. The gear teeth 19 may extend entirely around the channel or frame 18 or may only cover half of the circumference, in which latter case the direction of rotation of the complete closure must be reversed to restore the closure to its original position.

In the operation of the embodiment of Figures 1 and 2, rotation in either direction of the frame 18 and the assembled panel from the position of Figure 1 to that of Figure 2 will empty the fluid 16 from the pocket or chamber 15 into the space 14 between the panes. Obviously the rotation need not be the full 180° shown in Figure 2, since if stopped part way the fluid 16 will fill the space between the panes up to the level of the position of the chamber 15, thus shading or modulating the transparency of the panel over only a portion of the area thereof.

Figure 3:
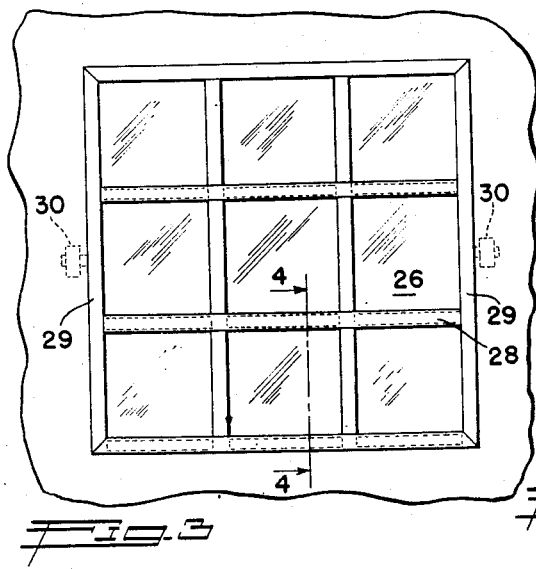
Figure 3 is a front view of a multi-paned window embodying a further form of my invention which is adapted to be tilted about a central horizontal axis.
Figure 4:
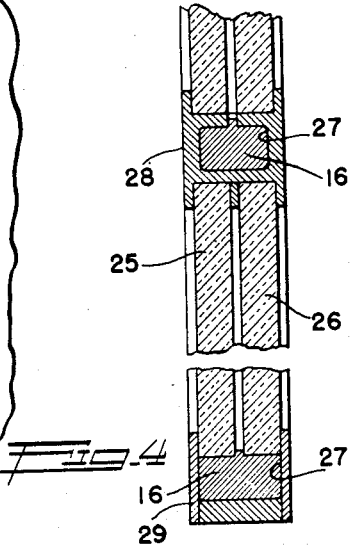
Figure 4 is an enlarged detail section on the line 4—4 of Figure 3.

A comparison of Figures 1 and 3 will show that the shape of the transparent panels may be altered as desired, as in Figures 3 and 4 the panes 25 and 26 are rectangular and the fluid chambers 27 are located in the horizontal mullions 28 of a window sash or frame 29 pivoted at 30 on a horizontal axis bisecting the window height. With this arrangement the window sash may be tilted about its axis to provide an awning effect and permit ventilation, as well as being completely reversed to both close the opening and to introduce an opaque or colored fluid 16 between the panels 25 and 26.

Figures 5 and 6 illustrate the application of the arrangement of Figure 3 to the lid 32 of a container or box 33. Such a container need not be rectangular since the circular panel assembly of Figure 1 can be used equally well, as for a lady's powder compact, for example. I have chosen, however, to show the specific application of my invention to a sample case or make-up box which, when carried by a handle 34 has the transparent panel 35 filled with an opaque liquid, such as mercury, from a chamber 36, to conceal the contents under such conditions. When the box or case is laid down on a flat surface the panel becomes transparent to exhibit the contents, and when the lid is raised, as in Figure 5, the lid again becomes a mirror, while access is had to the contents of the sample case or make-up box.

The fluid 16 used in the several disclosed embodiments of my invention may be mercury in the event an opaque shade and/or mirror is desired. If transparency or translucency is desired when the fluid is in place between the panes, various stable colored solutions are well known which give a wide choice as to color and/or light filtering effect. If exposure to freezing temperatures is not involved water may be the vehicle, otherwise some anti-freezing fluid, such as alcohol, glycerine, or ethylene glycol may be preferable. As an example, Stoddard's solvent used with various colors of oil soluble dyes has proved to run off the glass without leaving a residue.

Having thus described my invention it will be apparent that I have provided an improved and self contained transparent closure which may be rendered opaque or of variable density and/or color by tilting or rotating the closure to introduce or remove a liquid from the space between the dual glazing. Such a self-contained closure has a wide variety of uses and may take a wide variety of forms within the spirit of my invention. I therefore do not wish to be limited to the precise embodiments and details of construction set forth, but desire to avail myself of such variations and modifications as come within the scope of the appended claims.

I claim as my invention:

1. A transparent closure including a pivoted frame therefor arranged for tilting said closure relative to a fixed structure defining an opening normally closed thereby said transparent closure comprising at least one pair of parallel transparent panes so arranged in the pivoted frame as to provide a space therebetween, means sealing the margins of said panes, means defining a compact fluid chamber of increased cross-section fixedly positioned within the margin of said frame adjacent to a portion of the margin of said panes normally below and in communication with the space therebetween, the volume of said fluid chamber approximating the volume of the space between said panes, and a light modifying fluid normally positioned in said chamber when the closure is in its normal closed position, and adapted to be introduced into the space between said panes whereby to modify the light transmission therethrough when the closure and the chamber are pivoted to a position where the fluid chamber is elevated relative to the space between said panes.

2. A transparent closure including a frame therefor arranged for moving said closure relative to a fixed structure defining an opening closed thereby said transparent closure comprising at least on pair of parallel transparent panes so arranged in the frame as to provide a space therebetween, means sealing the margins of said panes, means defining a compact fluid chamber of increased cross-section fixedly positioned in such frame outside the transparent area within the frame and adjacent to a portion of the margin of said panes normally below and in communication with the space therebetween, the volume of said fluid chamber approximating the volume of the space between said panes, and a light modifying fluid normally positioned in said chamber when the transparent closure is in its normal closed position, and adapted to be introduced into the space between said panes whereby to modify the light transmission therethrough when the closure and the chamber are moved to a position where the fluid chamber is elevated relative to the space between said panes.

HARRY B. JANSEN.

REFERENCES CITED

The following references are of record in the file of this patent:

UNITED STATES PATENTS

| Number | Name | Date |
| --- | --- | --- |
| 192,843 | Sloan | July 10, 1887 |
| 2,373,214 | Wolkenhauer | Apr. 10, 1945 |
| 1,811,946 | Bailey | June 30, 1931 |
| 2,009,167 | Delano | July 23, 1935 |
| 1,124,778 | Mueler | Jan. 12, 1915 |
| 2,317,988 | Forssberg | May 4, 1943 |
| 2,286,810 | Ingels | June 16, 1942 |
| 2,279,121 | Kistler | Apr. 7, 1942 |
| 2,122,351 | Morris | June 28, 1938 |
| 2,358,791 | Callopy | Sept. 26, 1944 |
| 2,311,840 | Land | Feb. 23, 1943 |